United States Patent [19]

Almonte

[11] Patent Number: 5,353,275
[45] Date of Patent: Oct. 4, 1994

[54] BEAT FINDER

[75] Inventor: Carlos Almonte, Brooklyn, N.Y.

[73] Assignee: CT Sound 92, Brooklyn, N.Y.

[21] Appl. No.: 956,610

[22] Filed: Oct. 5, 1992

[51] Int. Cl.$^5$ .................. G11B 17/04; G11B 17/08; H04B 1/20
[52] U.S. Cl. .......................................... 369/189; 369/2
[58] Field of Search .................. 369/189, 1, 2, 3, 4, 369/5, 292, 264–267; 235/1 R, 103, 144 R, 115, 116, 119, 122

[56] References Cited

U.S. PATENT DOCUMENTS

| | | | |
|---|---|---|---|
| 2,562,245 | 7/1951 | Thompson | 369/267 |
| 2,598,138 | 5/1952 | Sharp | 369/267 |
| 2,634,133 | 4/1953 | Carboneau | 369/267 |
| 3,029,079 | 11/1959 | Pierce | 369/267 |
| 3,047,296 | 7/1962 | Chade | 369/267 |
| 3,161,355 | 12/1964 | Messer | 235/144 R |
| 4,293,765 | 10/1981 | Kashiwagi | 235/144 R |
| 4,300,225 | 11/1981 | Lambl . | |
| 4,473,741 | 9/1984 | Itoh et al. | 235/1 D |
| 4,523,305 | 6/1985 | Cheeseboro | 369/33 |

Primary Examiner—Stuart S. Levy
Assistant Examiner—William J. Klimowicz
Attorney, Agent, or Firm—Kuhn and Muller

[57] ABSTRACT

A beat finder is provided for accurately and repeatably setting a speed control on a turntable, for use by a disk jockey in quickly matching the beat of successive music selections using two turntables and a technique for matching the start of each beat, in a "no-pressure" environment, in as much time as required to accurately match the speed of the switchover. The position of the speed control at a the proper transition speed for a current musical selection as well as for a following musical selection is displayed for each of the corresponding turntables. These numbers are recorded on a "program form" to be used as a reference during the actual "real-time" club or disco performance. During the performance, the disk jockey need only cue up the next selection, set the speed control to the setting indicated on the program form and quickly match the start of the beat of the incoming musical selection with the current musical selection, by slipping or advancing a phonograph disk manually, knowing with confidence that the beat rate of both musical selections will match.

2 Claims, 6 Drawing Sheets

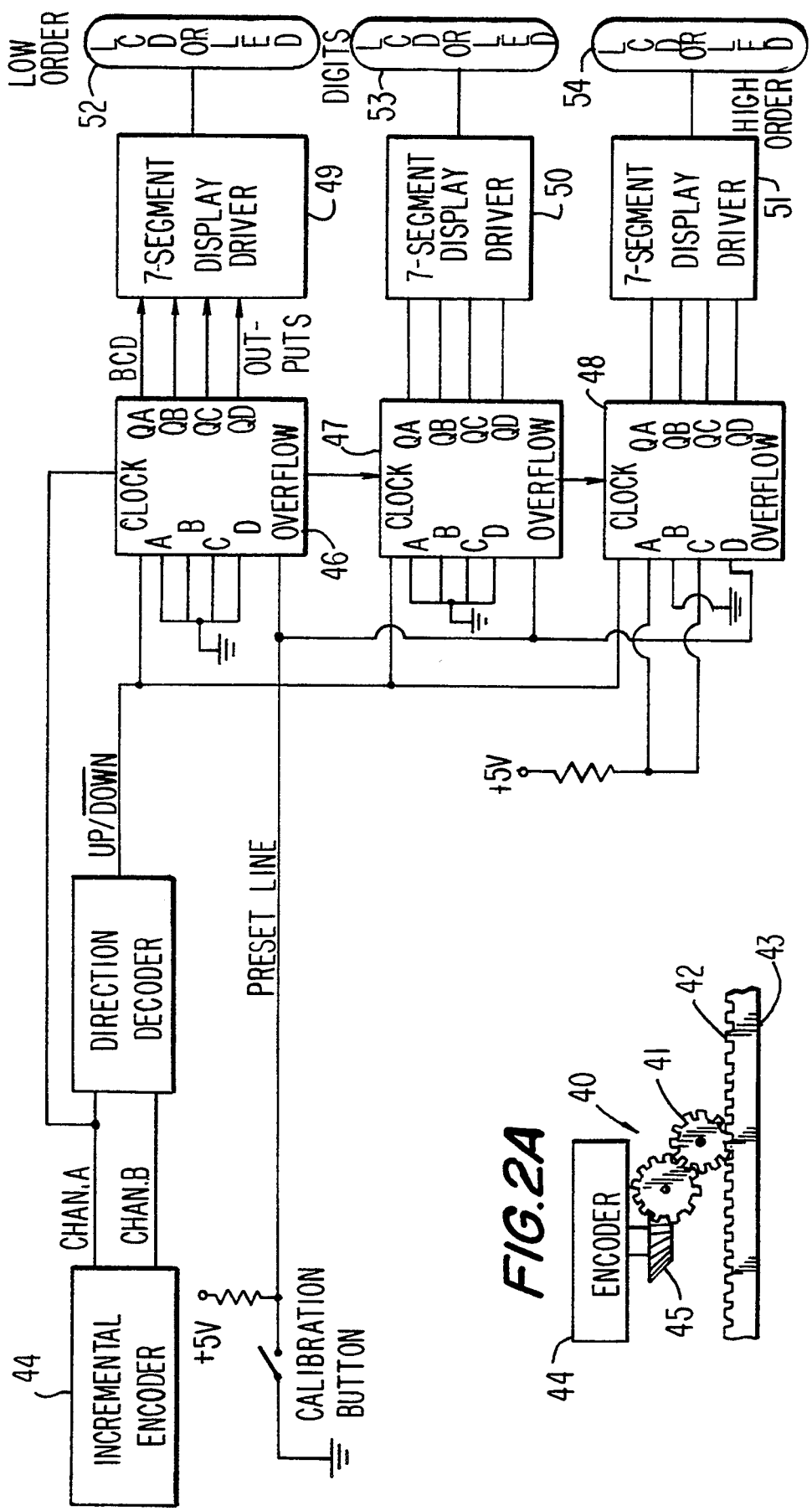

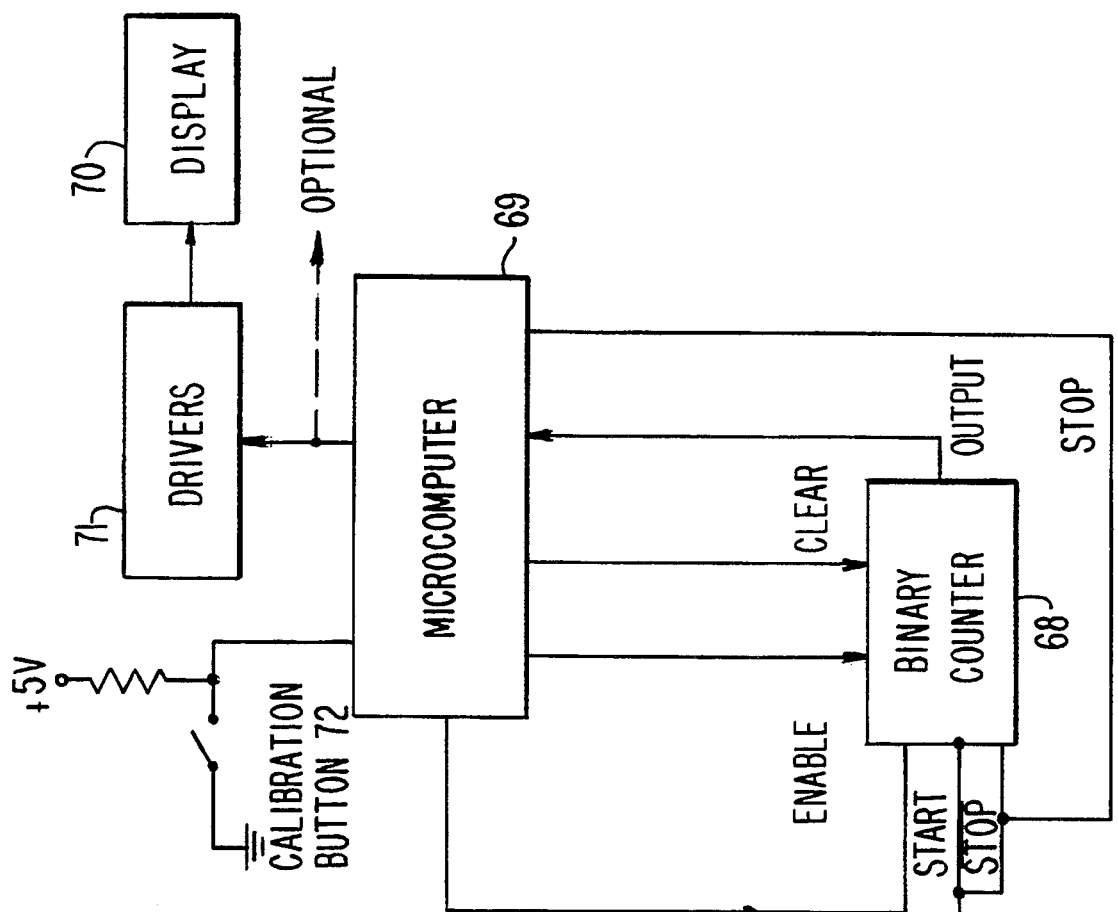
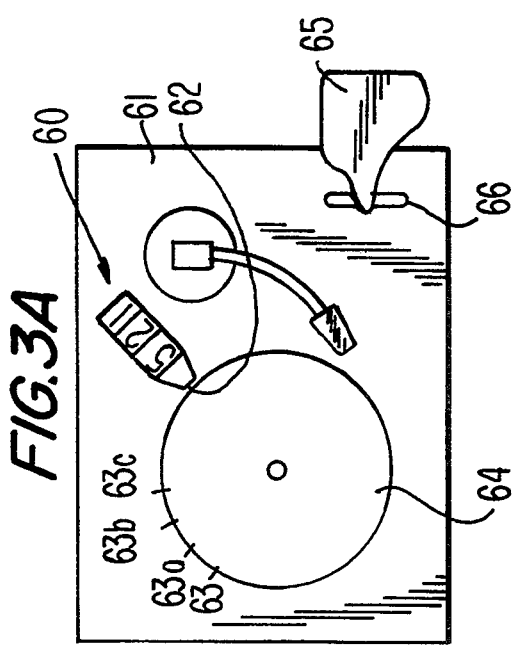
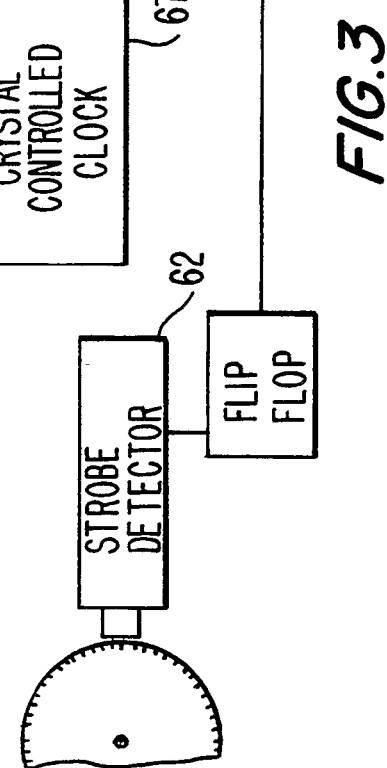
FIG. 3
FIG. 3A

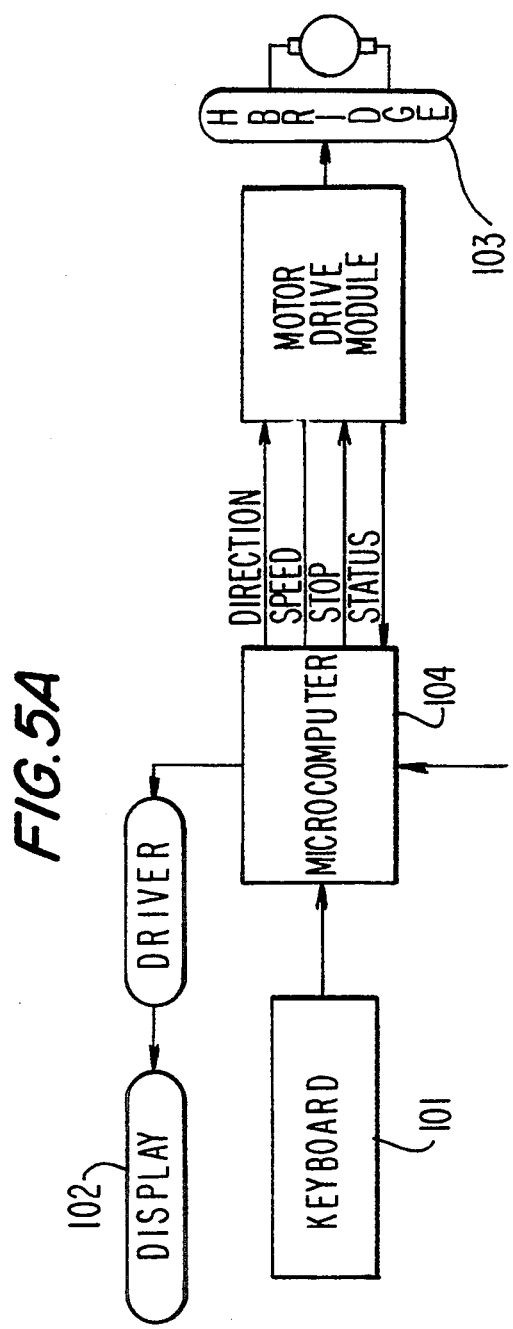
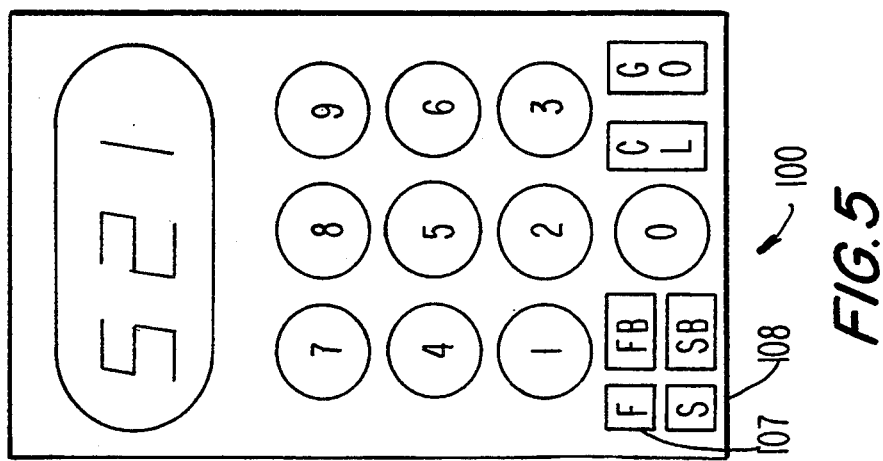

BEAT FINDER

INTRODUCTION

Although the present invention will be described as an accessory for a professional turntable, it is appreciated that these features can also be built into a newly designed turntable. Also, it is envisioned that at some point different audio media such as compact disks will replace vinyl records for disco use; at that point, the players for the new media should have speed control and cuing features similar to turntables to facilitate beat matching by a disk jockey. In such case, the BEAT FINDER would be adaptable for use with the new media.

BACKGROUND OF THE INVENTION

Various attempts have been made to synchronize the transition of disco or "house" music from one turntable to another. For example, U.S. Pat. No. 4,300,225 of Lambl describes an electronic device to alert a disc jockey that two beats of the songs are in synchronization, by providing a light at the moment of synchronization. However, the Lambl '225 device does not give the disc jockey lead time to predict when the synchronization will occur.

SUMMARY OF THE INVENTION

BEAT FINDER is a system for accurately and repeatably setting a speed control on a turntable. This is achieved by creating a digital readout which displays an index number representative of the position of the control. It has been found that a three digit display provides the required level of precision.

This system is used by a disk jockey in quickly matching the beat of successive music selections using two turntables and a manual technique for matching the start of each beat. The method of use is to perform a "dry run" of the intended sequence of selections. In such a "no-pressure" environment, as much time as required is taken to accurately match the speed of the switchover; this can be done just by listening or with the aid of a digital beat meter.

The position of the speed control at the proper transition speed for the current selection as well as for the following selection is displayed on the digital readout of the BEAT FINDER on each of the corresponding turntables. These numbers are recorded on a "program form" to be used as a reference during the actual "real-time" club or disco performance. During the performance, the disk jockey need only cue up the next selection, set the speed control to the setting indicated on the program form and quickly match the start of the beat with the current selection (by slipping or advancing disk manually) knowing with confidence that the beat rate will match.

With this system and technique, only two turntables need be used even with short selections lasting under one minute. Currently, without the availability of BEAT FINDER, three or four turntables are often used to pre-cue selections and to "prime" digital beat meters which require several seconds to capture and display beat timing. The expense of the extra turntables and beat meters (which are of questionable value for "club", rap or rock music) can therefore be avoided.

A further embodiment for a more accurate system that would permit the use of one turntable setup for the dry run and a second setup (perhaps even using different brands of turntables) for the actual performance is also described. In this scheme the index number for speed setting is not derived from the position of the speed control, but from the actual speed of the turntable itself, irrespective of the physical position of the speed control.

This is achieved by placing a steady light and a detector in a proximate relation to the strobe markings on the turntable. By appropriate processing of the strobe signals, an index number indicative of the actual speed can be derived. The disadvantage of this approach is that the index number can momentarily upset if the turntable is physically touched as, for example, when manually matching beat starts.

However, in the actual run by this time, the index information has already been used to set the appropriate speed and need not be further monitored. The time required to display the correct speed is very short (an update in less than half a second) and in no way approaches the several-second capture time of a typical beat meter.

While either approach can be used, the scheme detecting the position of the speed control is performed either entirely mechanically or electronically and is less expensive to implement than the electronic technique to derive the digital readout from the strobe information. Also, the control position technique provides a more stable (jitter-free) readout, which is not sensitive to physical interaction with the recording on the turntable.

The technique deriving the index number from the strobe provides more accuracy and total independence from the effects of backlash inherent to the speed control itself or to the added features as designed or due to mechanical wear. With a calibration method to be described, it provides portability of the program form notations, such that they are usable on a turntable setup of any manufacture that is equipped with the present invention, known as BEAT FINDER. The latter is true because actual speed is used to derive index numbers as opposed to control positions which can vary by model number design or manufacturing tolerance.

In addition to providing an index number to facilitate beat matching, a second feature of the present invention is the use of FAST and SLOW buttons which instantly shift the speed control a small fixed increment, to follow the beat in musical selections which often shift in this manner. This feature is implemented mechanically or electromechanically.

BRIEF DESCRIPTION OF THE DRAWINGS

The novel features of the present invention are set forth in the appended claims. The invention itself, however, both as to its construction and its manner of operation will best be understood from the following description of the preferred embodiments, which are described in the following drawings, in which:

FIG. 2 is a schematic view of an electronic version of the beat finder.

FIG. 2A is a close up view of a portion of the beat finder as in claim 2.

FIG. 3 is a schematic view of a strobe speed sensing embodiment of the beat finder.

FIG. 3A is a top plan view of the embodiment shown in FIG. 3.

FIG. 5 is a top plan view of a keyboard for another electronic embodiment of the beat finder.

FIG. 5A is a flow chart of the beat finder as in FIG. 5.

DETAILED DESCRIPTION OF THE DRAWINGS

Figure 1:
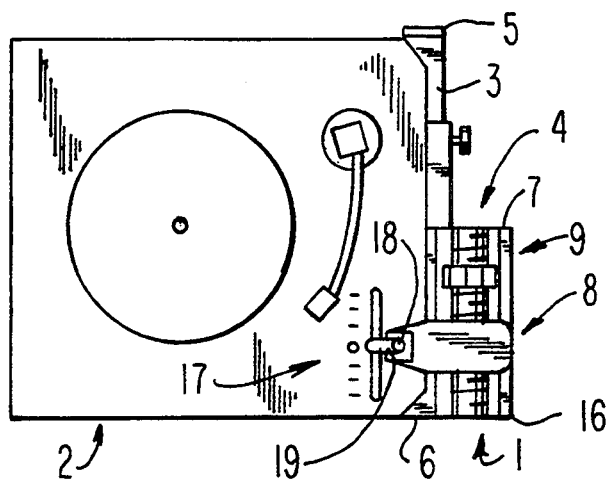
FIG. 1 is a top plan view of one embodiment of the present inventive beat finder.
Figure 1A:
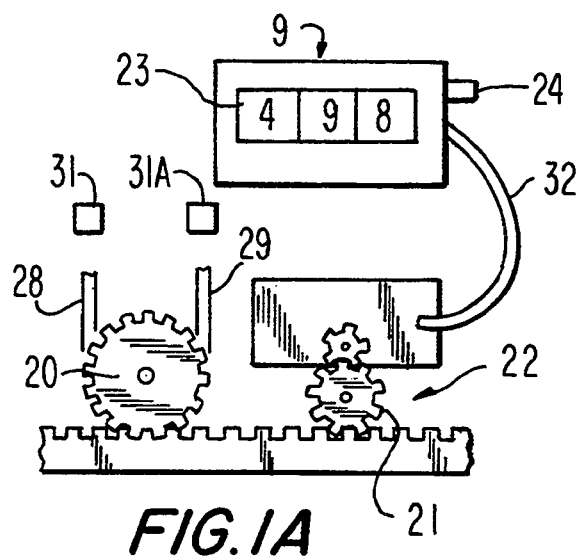
FIG. 1A is a close up front view of portions of the beat finder as in FIG. 1.
Figure 1B:
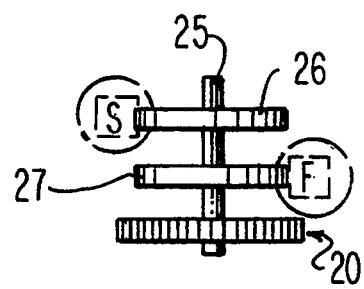
FIG. 1B is a close up view of a clutch mechanism of the beat finder as in FIG. 1.

The present invention encompasses a variety of feasible embodiments for a system for accurately and repeatedly setting a speed control on a turntable, to facilitate a gradual synchronization of two songs with different beats, such that the disc jockey has the freedom to use his or her own creative input in deciding when to phase out one song and introduce a following song.

Mechanical Version

In a totally mechanical version as shown in FIGS. 1, 1A, 1B, 1C and 1D there is provided an entire accessory beat finder removably attached to a turntable 2 by a clamp 3 with a telescoping section 4 which is adjustable to the depth of the turntable 2 and fits at each corner 5 and 6 of turntable 2.

There are three major sections to the accessory beat finder 1, a base plate 7, a movable control section 8 that rides on a base plate 7, and a three digit mechanical counter 9.

Figure 1C:
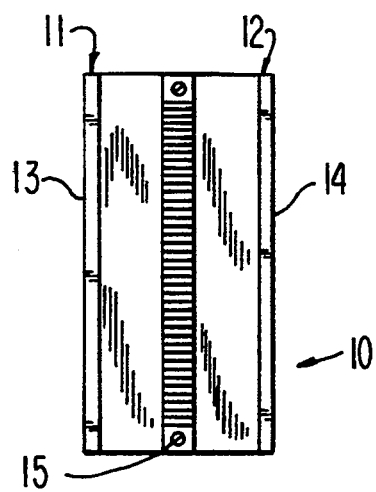
FIG. 1C is a close up view of a base plate of the beat finder as in FIG. 1.

As shown in FIG. 1C the base plate 7 consists of a rigid base plate 10 with raised rails 11 and 12 along each side 13 and 14 of rigid plate 10 and a gear rack 15 mounted between raised rails 11 and 12. In this embodiment, base plate 10 has no moving parts. The movable control section 8 has several parts and subassemblies generally enclosed by a top housing 16. This movable control section 8 engages the conventional speed control 17 through an adjustable extended coupling member 18 which slips over the speed control 17 (after the conventional knob is removed) and is attached with a clamp 19 using a set screw or Just the elasticity of a stiff rubber sleeve.

The movable control section 8 rides on the two side rails 11 and 12 on the base plate 10 and can move along base plate 10 at the same time varying the speed of the turntable 2 due to its control attachment.

The gear rack 15 on the base plate 10 is engaged by two gears 20, 21 attached to the movable control section 8. One gear 21 is coupled to a gear train 22 with a speed-increase ratio of the order of 150:1.

The output of this gear train 22 drives an up/down three digit mechanical counter 9 having digits 23 of normal construction (one count per revolution) except that it is designed to reset to "500" instead of the normal "000" when the reset button 24 is pushed. Both the gear train 22 and the counter 9 must be low friction and low inertia for good operation; the gear train 22 requires low backlash.

The second gear 20 in the movable control section is used to implement the "FAST/SLOW" beat feature. It too engages the gear rack 15 mounted to the base plate 10 to one side of the counter drive gear 21. This gear 20 is attached to a jack shaft 25 with two one-way clutches 26, 27 which have the ability to turn the shaft 25 in opposite directions when driven from their respective input rings.

The clutches 26, 27 can be of a variety of types in the state-of-the-art including sprag, wrap spring or even a variety using oriented fibers which slip in one direction and grab in the other. In any case, they are of concentric construction with an outer driven ring driving a shaft in the center.

The FAST and SLOW push buttons have shafts 28, 29, respectively, which fit through guidance holes in the top of the housing of the movable control section 8. They rest on compressions springs inside the housing which bias them in an upward position. When pushed beyond a certain amount, the side of the button shaft 28 or 29 touches (and engages) the driving ring of its corresponding clutch 26 or 27, for slow and fast clutches 26 or 27, thus causing the jack shaft 25 to rotate.

This action is further enhanced by coating the surface of the clutch driving ring with a resilient high friction material 30 (like a miniature rubber tire). It can be appreciated that the amount of rotation is a function of the distance the button 31 is pushed.

When the button 31 is released, the spring 32 returns the button 31 to its uppermost position; during this return excursion of the button shaft however, although the clutch driving ring turns in the opposite direction, the jack shaft 25 does not rotate due to the one-way clutch action.

To repeatably turn the jack shaft 25 a fixed amount each time, one should press the button 31 or 31A all the way until the button 31 or 31A is flush with the housing surface 16 and can go no further. Every time the jack shaft 25 turns, the entire movable control section 8 moves a fixed amount in the direction appropriate to the given button 31 that is pushed (FAST or SLOW direction) because the jack shaft 25 turns the gear 20 that is engaged with the rack 15 in the base plate 10.

To be able to adjust the fixed amount of travel for each button push, the button caps 31 or 31A are attached to the button shaft 28 or 29 with a screw thread; the button cap 31 or 31A is the nut portion and the button shaft 28 or 29 has a screw thread portion on top. The threads should be treated with a resilient thread lock or otherwise fit tightly so as not to rotate during normal "pushing" operations.

The button shafts 28 or 29 are of a square crossection and fit through square holes in the housing 16; in this way, the button heads 31 or 31A (which could be knurled around the sides to facilitate grabbing) can be rotated by hand to regulate the stroke length which in turn determines the distance the movable control section 8 moves with each button push.

Since the movable control section 8 is attached to the speed control 17, the speed is changed by a fixed amount when either button 31 or 31A is pushed. It is noted that when both buttons 31 and 31A are at the top of their excursion, their sides are not in contact with the driving rings of their respective clutches 26 for slow clutches or 27 for fast clutches. When the movable control section 8 is moved manually, the clutch jack shaft 25 just rotates freely (if the button shaft sides were still in contact, movement would be stopped or hampered because one clutch would attempt to drive the button shaft backwards regardless of direction).

The mechanical counter 9 is attached to the movable control housing 8 by an adjustable "gooseneck" tubing length that permits the convenient orientation of the number display. The gear train 22 drives the counter 9 through a flexible cable 32 (like a speedometer cable on a car). A "way cover" of a linear rubber bellows type may be used to enclose the gear rack 15 to protect it from dust and debris; this would also permit the use of a heavy grease lubricant to reduce wear and backlash without concern about contamination by touching the greasy rack.

The first time the BEAT FINDER i is used with a particular turntable, the speed should be set to "synchronous" or the center of the scale (most turntables will indicate with a light that this has been achieved); at this position the counter is reset to "500". Numbers above 500 will indicate speeds above synchronous while numbers below 500 will indicate speeds below synchronous. The FAST and SLOW buttons 31, 31A are set up initially and are adjusted for different types of music.

The beat finder 1 of the present invention may have other electronic embodiments; for each of these the index number display can be either derived from the position of the speed control or from sensing the actual speed from the strobe markings as described above.

Electronic Speed Control Position Sensing (ESCPS)

In this embodiment, a movable control section 40 similar to that in the mechanical embodiment has a position sensing gear 41 which engages the gear rack 42 in the base plate 43.

This gear 41, however, drives an incremental encoder disk 44 through a bevel gear drive 45 of appropriate step-up ratio (of the order of 15:1 or so). The bevel drive 45 permits the placement of the disk in a horizontal plane to maintain a low profile as shown in FIG. 2.

The incremental encoder 44 can be of the magnetic (ie. Hall Effect) or photoelectric type. These are commercially available in 15 or 16 or more segments and provide two separate channels of output phased 90 electrical degrees apart (quadrature signals). With the two signals, direction of rotation can be decoded with simple logic circuits.

The mechanical setup just described (or a similar setup) is the only option with manual adjustment of the speed control. If a motor drive is used to move the speed control, an encoder mounted on the motor can be used in lieu of the separate gear drive.

For three decimal digits, three 4-bit up/down decade counter modules 46, 47, 48 (such as the SN74HC190 from Texas Instruments) can be used. In either case, a method of synchronization is used at setup by pressing a button forcing the output display to "500" when the speed control is preset to synchronous speed, 33.3 RPM (or 45).

Each pulse detected from the encoder 44 will increment the counter by one or decrement it by one depending on the relative phase between the two signals (ie. direction). The outputs of the counter modules 46, 47, 48 provide a BCD output (binary coded decimal) which drives a 7-segment display driver 49, 50, 51 which, in turn, drives the corresponding LED (light emitting diode) or LCD (liquid crystal) display digit sets 52, 53, 54.

With a manual adjustment system using this type of number generation, the power is required just for this subsystem. In this case, with an LCD display and low power CMOS circuitry, battery power would be feasible. For any other electronic system to be described, either because of LED choice or motor drive or strobe speed sensing, a wall-mount plug-in power supply is required.

Strobe Speed Sensing (SSS)

Figures 3B, 3C:
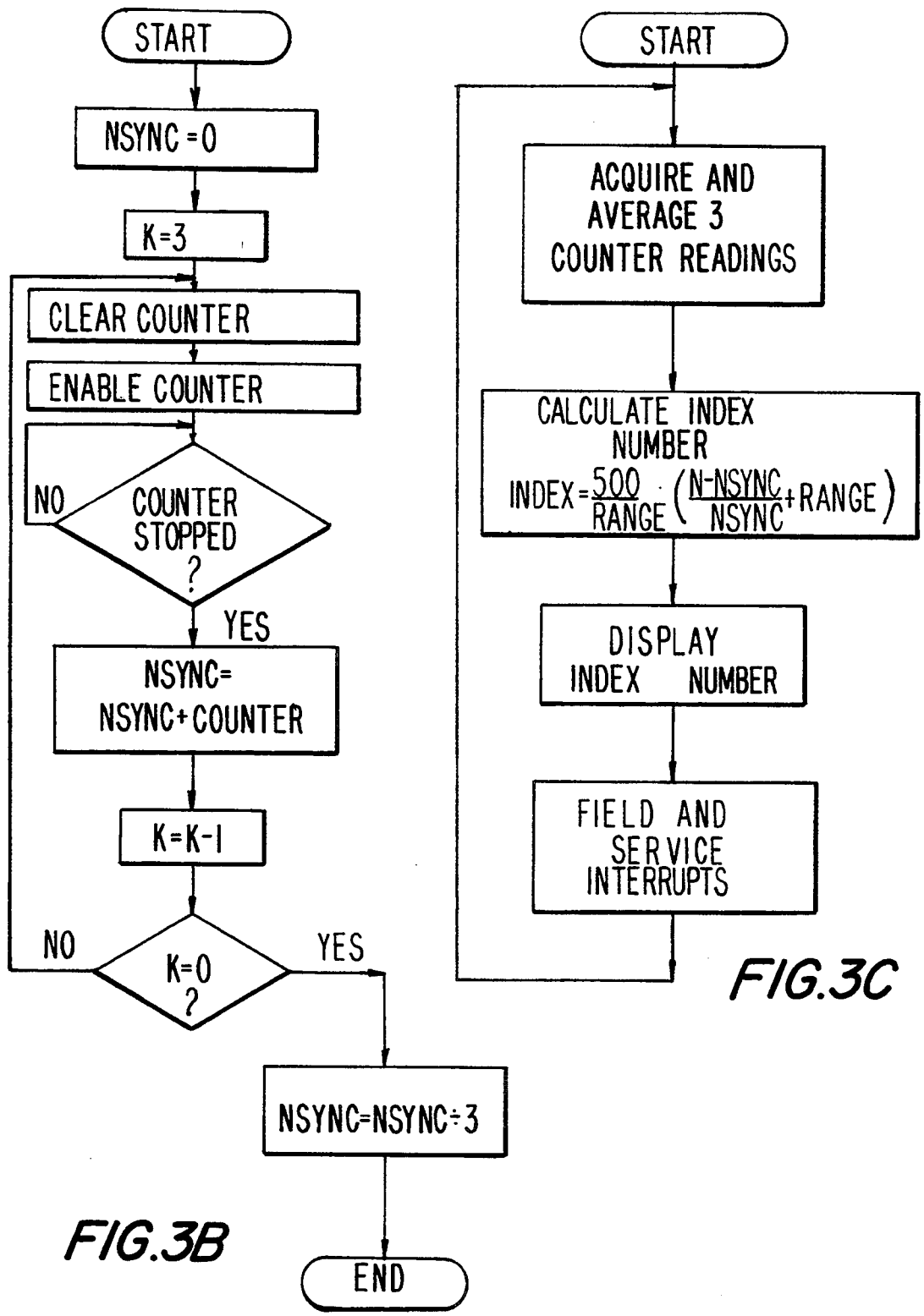
FIG. 3B is a flow chart of the calibration routine for the embodiment shown in FIG. 3.
FIG. 3C is a flow chart of the operation of the embodiment shown in FIG. 3.

For Strobe Speed Sensing embodiment, as shown in FIGS. 3 and 3A, a small enclosure 60 containing the detection circuitry, the logic modules and/or processor, and the numeric display will be removably attached to the turntable chassis surface 61 in such a position that the light source and detector 62 are properly aimed at the strobe markings 63, 63a, 63b, etc. on the periphery of the of the actual turntable disk 64.

This can be accomplished by adhesively attaching a small patch of "hook" material to the turntable chassis surface 61 which mates with "loop" material attached to the underside of the housing (a familiar brand name is Velcro).

This enclosure will not have any mechanical connection to the other part of the BEAT FINDER 65 which is in the vicinity of the speed control 66, as shown in FIG. 3. The implementation of this subsystem is not novel in itself but can follow any state-of-the-art designs including the microprocessor variety to be described. The detector 62 consists of a steady light source implemented as an infrared LED and a darlington infrared phototransistor reading reflected light.

This assembly is partially shaded by a hood to exclude most ambient light from the detector area. The phototransistor is biased in such a manner that it will trigger a schmidt trigger CMOS logic buffer when aimed at a light colored segment of the strobe pattern (by LED light reflected off it) while it will provide a logic "0" output when aimed at a black segment. At synchronous speed, this 0/1 pattern will switch at a time of the order of 30 ms or so. A high speed crystal controlled clock 67 can be used to time this interval by incrementing a binary counter 68 for the time interval between strobe signals.

The clock 67 or its derivative can be used as the clocking signal for a simple 8-bit microprocessor 69 of the "appliance control" class such as many part numbers made by NEC or Motorola. These can be a complete microcomputer on-a-chip if they also contain ROM and RAM.

A variety of algorithms can be used to determine speed from the count in the counter 68. The processor 69 is also used to drive the output digital display 70 (either LED or LCD) by means of driver 71, to provide a three digit index number indicative of the relative speed above synchronous (500 up) or below synchronous (500 down).

A calibration button 72 is pushed at startup after the speed control is used to achieve synchronous speed; this forces the output to "500" and records the average number in the counter 68 at this speed to be used as a comparand to calculate the proper index numbers at all other speeds. The algorithm can include "filtering" to reduce jitter in the output.

Electronic Digital Readout With Manual Speed Adjustment

Figure 4:
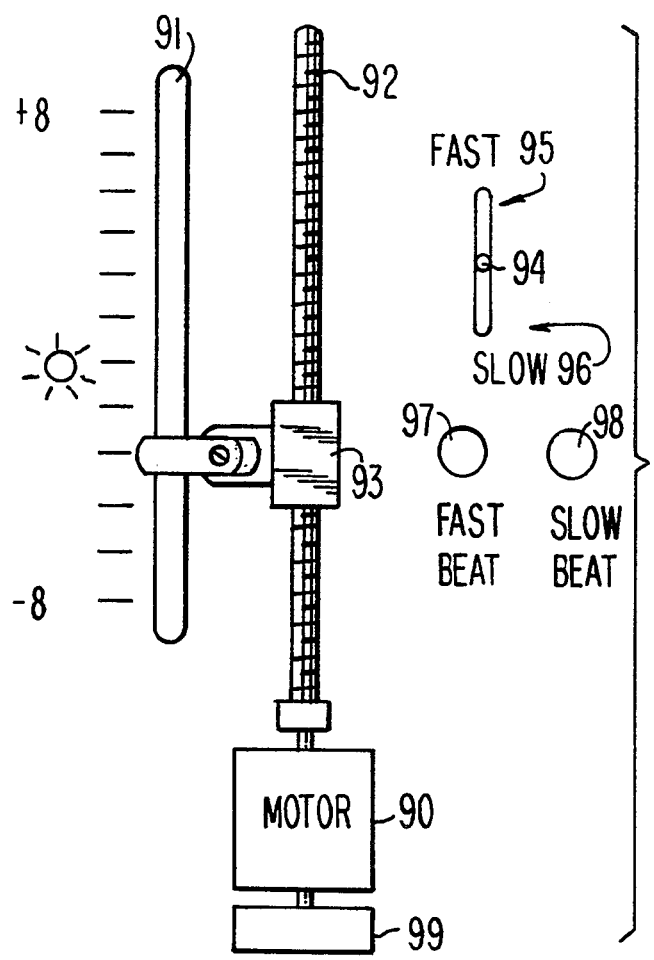
FIG. 4 is a close up top plan view of another embodiment of the beat finder.
Figure 4A:
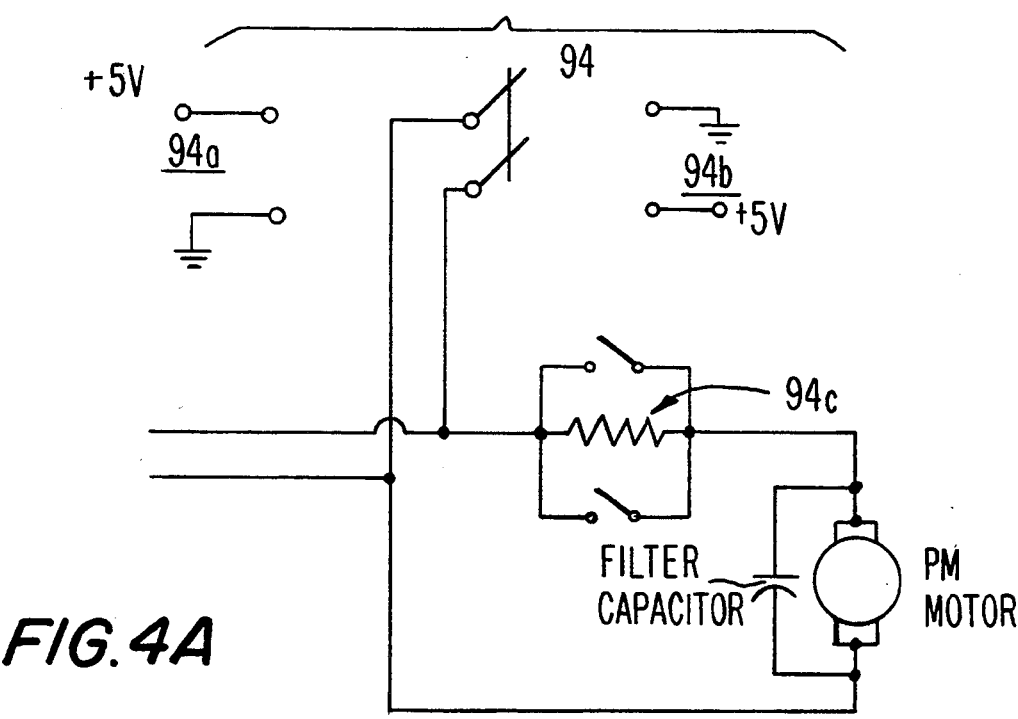
FIG. 4A is an electrical schematic of the beat finder as in FIG. 4.

As shown in FIGS. 4 and 4A, this embodiment is used with the ESCPS or SSS subsystems described above. The manual adjustment features are very similar to those described in the mechnical embodiment of FIGS. 1–1D, including the base plate with two rails and a gear rack which engages a gear or gears in the movable control section.

Figure 1D:
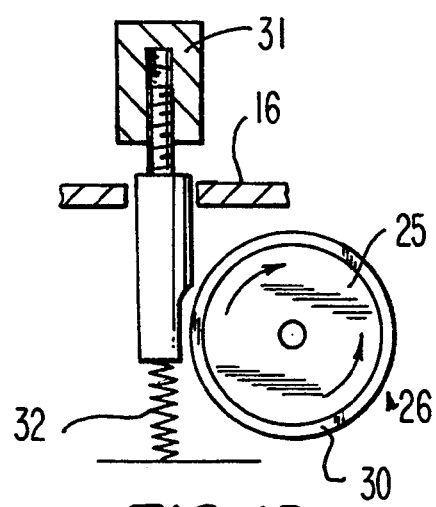
FIG. 1D is a detail of a portion of the beat finder as in FIG. 1.

The FAST/SLOW buttons and their operation would be identical to that in FIGS. 1–1D. A second gear which engages the rack is required only in the ESCPS version to drive the incremental position encoder. The housing of the movable control section must contain the ESCPS electronics in addition to the encoder; if an LCD display is used with battery, the battery may also be located here.

With the ESCPS version, the display may be attached to the housing via a "gooseneck" to provide optimal aiming for convenience.

Electronic Digital Readout With Motor Drive

As shown in FIGS. 4 and 4A, an embodiment can be used with the ESCPS or SSS subsystems described above. Instead of manually pushing the speed control to the desired position (by moving an attached portion of BEAT FINDER) a small motor 90 is used to position the speed control 91 to the desired location by driving a lead screw 92.

The anti-backlash lead screw nut 93 is attached to the speed control 91. An appropriate motor 90 to use is a brush type DC permanent magnet (PM) motor which has high power output for a given size, is easily reversible and low cost. Other motors that can be used include stepper motors or brushless DC motors. A disadvantage of the brush type motors is electrical noise generated from sparks at the commutator; they must be well filtered to prevent audio noise entering the audio circuits.

While speed control is not required, a high/low speed control may be desirable to slow down the motor as it approaches its destination to avoid overshoot and the need to then reverse.

The motor 90 is controlled by a simple joystick 94 which moves the motor in opposite directions 95, 96 depending on the direction from home that the stick 94 is moved. The amount of movement of the joystick 94 can be used to select slow speed at location 96 or high speed at location 96. The FAST 97 and SLOW 98 beat buttons now cause the motor 90 to turn a fixed amount (settable by coding DIP switches) in the respective directions.

The motor 90 is equipped with an encoder 99 which detects the degree of movement to match with the DIP switch settings when the FAST or SLOW beat buttons 97, 98 are pushed; when the desired amount matches, the motor 90 stops. This same encoder can be shared with the ESCPS subsystem if used. In this embodiment, the gear rack and corresponding gear(s) are not used.

As shown in FIG. 4A, switches 94a and 94b are normally open SPST microswitches which short out the slowing resistor 94c when joystick 94 is pushed to either limit, thereby speeding the motor 90.

Electronic Digital Readout With Motor Drive and Destination Setting

As shown in FIG. 5, another embodiment uses a digital destination setting entered from a keyboard 100 to guide the motor. This requires some additional circuitry and can be used either with the ESCPS or SSS type subsystems. Here an entry keyboard 101, destination display 102, digital comparator and motor control are added.

In the SSS version, a control cable that contains the position information (BCD lines feeding the index display) must be attached from the SSS unit to the motor control unit. Also in the SSS version, an incremental encoder on the motor is not required since even the FAST/SLOW Beat feature can be implemented using the index numbers generated by the SSS subsystem, as shown in FIG. 5. A circuit which automatically slows the motor as it approaches its destination can be implemented by comparing the BCD digits of the index numbers (location vs. destination) slowing down the motor when the difference is less than a fixed criteria.

The direction to drive the motor must be determined by the relative magnitude of the position and destination index numbers. An H-bridge motor driver 103 with an intelligent motor control chip is an efficient implementation.

With a keyboard 100, magnitude comparisons, display driving and other options, an "appliance grade" microcomputer 104 is the system of choice for this embodiment of BEAT FINDER. One keyboard 100 configuration includes the following keys: 10 digit keys ... 0–9, Faster, Slower, GO, Fast Beat, Slow Beat and Clear. The operation is fairly intuitive. Pressing the Faster or Slower keys 107, 108 turns the motor so as to move the speed control in the desired direction as long as the key is depressed. A quick jab moves the control one index digit. The Fast Beat and Slow Beat buttons 107, 108 move the speed control a preprogrammed amount regardless of the duration of actuation; to program the increment they are pressed both together, then an increment is entered using digit keys, then requiring one to hit GO. To move to an index number destination, one clears, enters digit keys, and hits "GO."

Conclusion

In conclusion, the present beat finder invention is a system for accurately and repeatedly setting a speed control on one or more turntables, to enable a disc jockey to control the synchronization of a plurality of songs with different beats, such as bass beats, in a "non-pressure" environment, where the disc jockey can plan when he wants to keep one song mute while the other song plays out.

The present invention is an improvement over the prior art devices, which electronically match the beats of two songs, but which restrict the disc jockey by limiting when the disc jockey can change from one song to another, that is, at the exact moment when the machine informs the disc jockey that two songs are in sync. Such a situation puts a lot of pressure on a disc jockey, who must wait until the prior art device tells the disc jockey that two beats now match. In contrast, the present invention permits the disc jockey a "lead time" in which to plan a creative mix of music and to introduce a song.

It should be understood that the invention may be embodied in other forms without departing from the spirit and scope of the present invention, as noted in the appended claims.

I claim:

1. An accessory for a turntable to control speed control and to facilitate beat matching, to synchronize the transition of recorded music sources from one turntable to another turntable of a plurality of turntables, comprising: said recorded music sources containing basic beat rhythm patterns unique to each of said recorded music sources a means to predict when the synchronization of said basic beat rhythm patterns will occur, said means creating a digital readout when said digital readout displays an index number representative of the position of a speed control member;

a speed control means for matching said basic beat rhythm patterns of successive recorded musical selections from one said turntable to another said turntable of said plurality of turntables;

a beat finder responsive to accurately and repeatedly setting at least one speed on said speed control on at lest one said turntable of said plurality of turntables, said beat finder capable of facilitating a gradual synchronization of two recorded musical selections with different beat rhythm patterns wherein said beat finder is removably attached to at least one of said turntables of said plurality of turntables by a clamp member with a telescoping section, which said clamp is adjustable to a predetermined depth of said turntable and which said clamp fits to said turntable, said beat finder further including:

a base plate, a movable control section movably ridable on said base plate, and a digital display counter, said base plate including a further rigid base plate, a plurality of raised rails positioned along each side of said base plate, a gear rack mounted between said raised rails, said movable control section enclosed by a housing, said movable control section engageable with said speed control through an adjustable extended coupling member which said coupling member is disposed over said speed control means, said movable control section movable on said side rails on said base plate, said movable control section varying a speed of one of said turntables, said gear rack on said base plate engageable by at least one gear attachable to said movable control section, and said at least one gear being coupled to a gear train with a speed-increase ratio, said gear train driving said digital display counter.

2. The beat finder as in claim 1 further comprising:

said gear train and said counter being of low friction and of low inertia;

a gear engageable with said gear rack and attachable to a jack shaft with at least one button member of a plurality of one-way clutches for turning said shaft in opposite directions when driven from their respective input rings, at least one button member of a plurality of button members having shafts which fit through guidance holes in a top of said housing of said movable control section, said jack shaft turning said gear engageable with said rack in said base plate;

a means to adjust a fixed amount of travel for each push of each said button member, said means being said button member being attachable to said button shaft said movable control section responsive to moves of each said button push;

said counter attachable to said movable control housing to orient a number display; and said gear train driving said counter through a flexible cable.

* * * * *